(12) United States Patent
Gao et al.

(10) Patent No.: US 8,509,103 B2
(45) Date of Patent: Aug. 13, 2013

(54) METHODS AND APPARATUSES TO IMPROVE PERFORMANCE OF COEXISTING RADIO SIGNALS

(75) Inventors: Jie Gao, Sunnyvale, CA (US); Xintian E. Lin, Palo Alto, CA (US); Hsin-Yuo Liu, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 578 days.

(21) Appl. No.: 12/770,271

(22) Filed: Apr. 29, 2010

(65) Prior Publication Data
US 2011/0267966 A1  Nov. 3, 2011

(51) Int. Cl.
*H04J 1/16* (2006.01)
*H04W 4/00* (2009.01)

(52) U.S. Cl.
USPC .................. 370/252; 370/276; 370/328

(58) Field of Classification Search
USPC ........................................... 370/252
See application file for complete search history.

(56) References Cited

U.S. PATENT DOCUMENTS
2007/0141992 A1* 6/2007 Kwa et al. ............... 455/63.1
2010/0296407 A1* 11/2010 Medvedev et al. ........ 370/252
2011/0026418 A1* 2/2011 Bollea et al. .............. 370/252

* cited by examiner

*Primary Examiner* — Steven H Nguyen
*Assistant Examiner* — Abu-Sayeed Haque
(74) *Attorney, Agent, or Firm* — Cool Patent, P.C.; Joseph P. Curtin

(57) ABSTRACT

Embodiments of a method and an apparatus for improving the performance of coexisting wireless radio signals are described. In one embodiment, the method includes detecting burst-type interference based on a packet error rate and a transmission rate associated with a transmitter. The method further includes setting the transmission rate in accordance with a burst-type rate-adaptation mode to increase data throughput.

18 Claims, 5 Drawing Sheets

METHODS AND APPARATUSES TO IMPROVE PERFORMANCE OF COEXISTING RADIO SIGNALS

FIELD OF THE INVENTION

Embodiments of the invention relate to wireless communication systems; more particularly, embodiments of the invention relate to co-existence of wireless radios in conjunction with differing protocols.

BACKGROUND OF THE INVENTION

Wireless local area network (WLAN) radios, such as IEEE 802.11 compliant radios, and Bluetooth (BT) radios are available in many platforms. WLAN and BT operate on the same frequency band (2.4-2.5 GHz). There are many usage models that require the co-existence of WLAN and BT signals. For instance, there is a usage model of watching television or video over the Internet using WLAN while using the BT headset for the stereo audio. It is desirable to manage the WLAN throughput while facing interference from BT transmissions.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
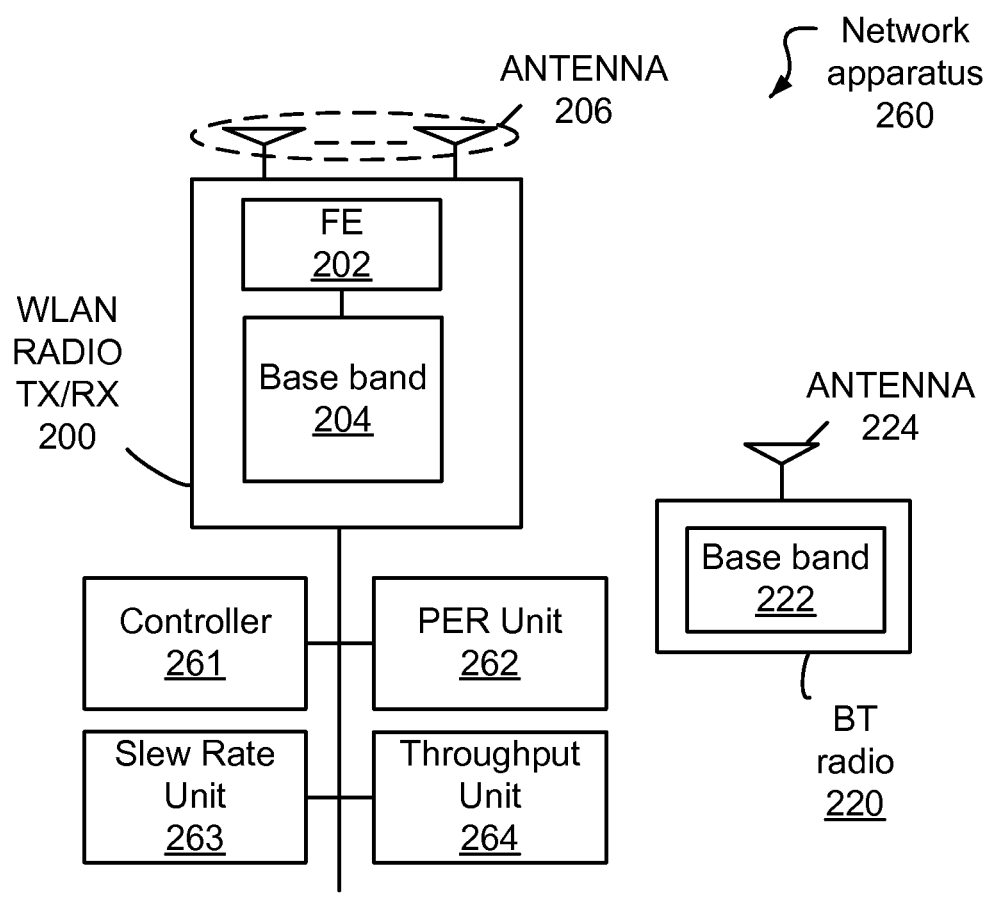
FIG. 1 is a block diagram of a network apparatus in accordance with one embodiment of the invention.

Embodiments of a method and an apparatus for improving the performance of coexisting wireless radio signals are described. In one embodiment, the method includes detecting burst-type interference based on a packet error rate and a transmission rate associated with a transmitter. The method further includes setting the transmission rate in accordance with a burst-type rate-adaptation mode to increase data throughput.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals, systems, or both, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11h, 802.11i, 802.11n.

OVERVIEW

Embodiments of a method and an apparatus for improving the performance of coexisting wireless radio signals are described. In one embodiment, the method includes detecting burst-type interference based on a packet error rate and a transmission rate associated with a transmitter. The method further includes setting the transmission rate in accordance with a burst-type rate-adaptation mode to increase data throughput.

FIG. 1 is a block diagram of a network apparatus in accordance with one embodiment of the invention. Many related components, such as buses and peripherals, have not been shown to avoid obscuring the invention. Referring to FIG. 1, network apparatus 260 comprises WLAN radio device 200, controller 261, Packet Error Rate determination unit (PER unit) 262, slew rate unit 263, throughput unit 264, and a Bluetooth radio device 220. In the case in which MIMO is supported, network apparatus 260 is used to receive signals from a main antenna and to receive signals from an auxiliary antenna. Other devices (not depicted) can communicate with the system of FIG. 1 using at least WLAN, WWAN, or BT. In one embodiment, BT radio device 220 includes baseband 222 and antenna 224.

In one embodiment, WLAN radio device 200 includes analog front end (FE 202), base band 204, and antenna 206. WLAN radio device 200 is capable of transmitting and receiving in accordance with IEEE 802.11x. In one embodiment, FE 202 is communicatively coupled to antenna 206 and provides signal filtering capabilities. In one embodiment, a transmitter includes FE 202 and baseband 204.

Burst-Type Interference

In one embodiment, WLAN radio device 200 is operable to transmit at different transmission rates in accordance with one or more wireless protocols. WLAN radio device 200 faces interference from different sources, such as, for example, a radio signal from BT radio device 220, a radio signal from other Bluetooth devices external to network apparatus 260, and a radio signal from a microwave oven. In a notebook environment, throughput of a WIFI TCP 1 connection can be reduced significantly (e.g., to 197 Kbps) if the isolation between co-existing radio signals is about 20 dB.

In one embodiment, antenna 206 and antenna 224 are positioned very close to each other. In one embodiment, antenna 206 and antenna 224 are the same antenna shared between WLAN radio device 200 and BT radio device 220. The isolation between the radio signals is low (e.g., less than 25 dB or less than 15 dB) in such arrangements.

In one embodiment, if the transmission rate of WLAN radio device 200 is 54 Mbps and the transmission duration of a data packet is about 20 µs, the transmission is of a higher probability to pass through gaps between interference caused by bursts of another radio transmission (e.g., a Bluetooth radio transmission). If the transmission rate of WLAN radio device 200 is set to 1 Mbps, a data packet becomes 54 times longer and therefore more susceptible to a packet collision (or interference) caused by bursts of another radio transmission. The packet error rate is therefore lower when the transmission rate is higher when the noise/interference is of a burst-type profile.

In one embodiment, burst-type interference has a duty cycle about less than 70% of a period. For example, the duty cycle of an interference signal from a Bluetooth source is about 10-40%. For example, the duty cycle of an interference signal from a microwave oven source is about 10-50%. A bursty radio signal is sometimes caused by transmission of data in short and intermittent spurts.

In one embodiment, PER unit 262 determines a packet error rate associated with WLAN radio device 200.

In one embodiment, slew rate unit 263 computes a slew rate based on several sets of data about the packet error rate and the transmission rate of WLAN radio device 200. In one embodiment, the slew rate or the gradient is positive if the packet error rate is positively correlated with the transmission rate (i.e., a higher transmission rate causes a higher packet error rate). The slew rate is negative if the packet error rate is negatively correlated with the transmission rate. In one embodiment, the slew rate is usually negative if the dominant source of interference is of a burst-type profile. For example, for every WLAN transmission-rate mode (e.g., 54 Mbps, 48 Mbps, 11 Mbps, 1 Mbps, etc.), slew rate unit 263 calculates the number of total packets and the number of packets which have failed the transmission. Slew rate unit 263 calculates a value of the packet error rate in conjunction with each transmission rate.

In one embodiment, throughput unit 264 computes a throughput of transmission performed by WLAN radio device 200. In one embodiment, throughput is calculated as: (1−packet error rate)×transmission rate.

In one embodiment, controller 261 communicates with PER unit 262, slew unit 263, throughput 264, and other modules (not shown) to collect statistic information including the transmission rate, the packet error rate, and the throughput. In one embodiment, controller 261 receives that statistics from a driver module. The statistic information is collected at the frequency of a sampling period (e.g., N seconds).

In one embodiment, controller 261 detects an occurrence of burst-type interference caused by a co-existing radio (e.g., BT signal) by using information including the packet error rate and the transmission rate. In one embodiment, controller 261 selects to use a burst-type rate-adaptation mode and sets the transmission rate accordingly.

In one embodiment, controller 261 receives information from slew rate unit 263 which indicate whether or not the slew rate (also referred to as trend or gradient) of a packet error rate against a transmission rate is positive. In one embodiment, controller 261 determines that a burst-type radio signal co-exists if the slew rate is negative. Otherwise, controller 261 continues to use a normal rate-adaptation mode.

In one embodiment, controller 261 sets the transmission rate of WLAN radio device 200 to the lowest transmission rate and then to the highest transmission rate. Controller 261 compares the packet error rates with respect to the two transmission rates. If the packet error rate in conjunction with the lowest transmission rate is higher than the packet error rate in conjunction with the highest transmission rate, controller 261 determines that burst-type interference occurs or co-exists. In one embodiment, for example, a packet error rate in conjunction with the highest transmission rate is 0.1, while the packet error rate in conjunction with the lowest transmission 1 rate is 3 times greater (i.e., 0.3), controller 261 detects that burst-type interference has occurred.

In one embodiment, controller 261 detects that packet error rate becomes lower in conjunction with a higher transmission rate. Controller 261 determines that burst-type interference has occurred.

Burst-Type Rate Adaptation Mode

In one embodiment, a rate-adaptation mode deals with varying levels of signal-to-interference-noise ratio (SINR). A normal rate-adaptation mode caters towards thermal-noise interference, which varies continuously and slowly. Controller 261 gradually reduces the transmission rate and uses more robust modulation schemes in accordance with the normal rate-adaptation mode. If a transmission fails, controller 261 switches to a lower transmission rate until the lowest transmission rate (e.g., 1 Mbps). This normal rate-adaptation mode works well if the interference is a thermal-type noise. Therefore, with respect to burst-type interference, controller 261 selects a burst-type rate-adaptation mode which typically sets the transmission rate to a greater value when the burst-type interference occurs.

In one embodiment, controller 261 increases the transmission data rate to reduce the packet length of a data packet such that the chance of error-free communication increases.

In one embodiment, controller 261 continues to operate in accordance with the burst-type rate-adaptation mode for a period of time before switching back to the normal rate-adaptation mode. In one embodiment, controller 261 reverts to the normal rate-adaptation mode if the packet error rate significantly decreases at the same transmission rate (because burst-type interference has reduced significantly or has stopped). In one embodiment, if packet error rate is less than 1/M of a previous packet error rate, controller 261 determines that the burst-type interference has reduced significantly and thus controller 261 sets to use the normal rate-adaptation mode. In one embodiment, for example, the value of M is 10.

In one embodiment, controller 261 receives throughput values from throughput unit 264 which repeatedly calculates the throughput values associated with different transmission rates. In one embodiment, controller 261 selects a transmission rate which results in the best throughput (or a better throughput). For example, if packet error rates are 0.2 and 0.1 corresponding to transmission rates of 48 Mbps and 36 Mbps respectively, the throughput values are 38.4 Mbps (transmission rate at 48 Mbps) and 32.4 Mbps (transmission rate at 36 Mbps).

In one embodiment, controller 261 repeats using a transmission rate for N times so that N packet error rate data is obtained. In one embodiment, the repetition is performed when in use, in a lab environment, or both.

In one embodiment, the aforementioned units are shown as discrete devices. Other embodiments are possible in which some or all of these units are integrated within a device or within other devices. In other embodiments, the aforementioned units are distributed throughout a system in hardware, software, or some combination thereof.

The methods and apparatuses for improving data communication performance of a system in conjunction with coexistence of radio signals are not so limited, as they may be implemented on or in association with any integrated circuit device or system, such as, cell phones, personal digital assistants, embedded controllers, mobile platforms, desktop platforms, and server platforms, as well as in conjunction with other wireless standards or protocols.

Figure 2:
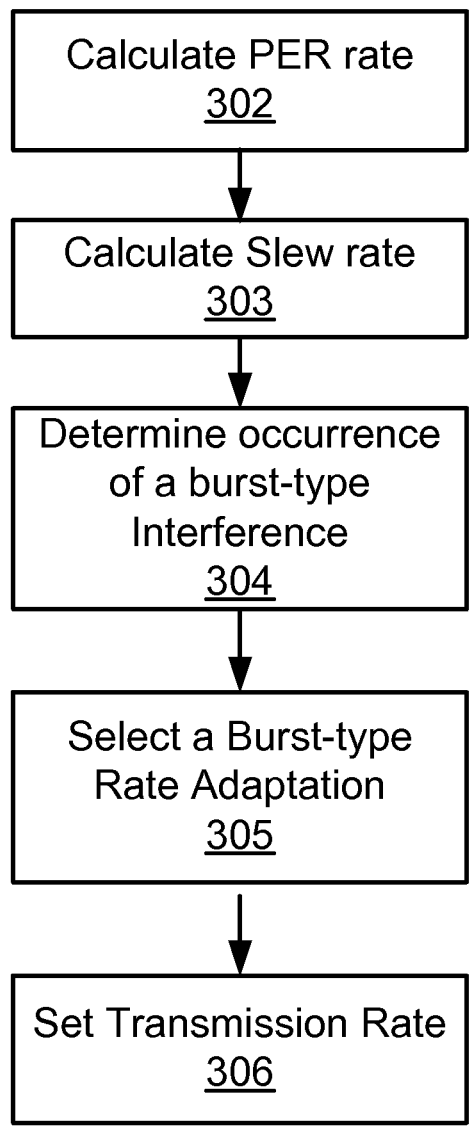
FIG. 2 is a flow diagram of one embodiment of a process to detect burst-type interference.

FIG. 2 is a flow diagram of one embodiment of a process to detect burst-type interference. The process is performed by processing logic that may comprise hardware (circuitry, dedicated logic, etc.), software (such as one that is run on a general-purpose computer system or a dedicated machine), or a combination of both. In one embodiment, the process is performed in conjunction with a network apparatus (e.g., network apparatus 260 with respect to FIG. 1). In one embodiment, the process is performed by a computer system with respect to FIG. 5.

Referring to FIG. 2, in one embodiment, processing logic begins by calculating and determining a packet error rate (process block 302) and a slew rate (process block 303). In one embodiment, processing logic determines a packet error rate associated with a WLAN radio transmitter. In one embodiment, processing logic computes a slew rate based on several sets of data about the packet error rate and the transmission rate of a WLAN radio transmitter. In one 1 embodiment, the slew rate is positive if the packet error rate is positively correlated with the transmission rate (i.e., a higher transmission rate causes a higher packet error rate). The slew rate is negative if the packet error rate is negatively correlated with the transmission rate.

In one embodiment, processing logic detects whether burst-type interference occurs/exists based on a packet error rate and a transmission rate (process block 304). In one embodiment, processing logic determines that burst-type interference exists if the slew rate is negative. In one embodiment, processing logic detects that burst-type interference occurs if the packet error rate in conjunction with the lowest transmission rate is greater than that of the highest transmission rate. In one embodiment, processing logic determines that burst-type interference occurs if the packet error rate in conjunction with the lowest transmission rate is N times greater than that of the highest transmission rate. N is a non-zero integer (e.g., 3 and above).

In one embodiment, processing logic selects a burst-type rate-adaptation mode if the burst-type interference occurs (process block 305). Otherwise, processing logic operates in conjunction with a normal rate-adaptation mode. In one embodiment, processing logic sets a transmission rate in accordance with the burst-type rate-adaptation mode (process block 306). In one embodiment, the transmission rate is higher compared with the value in accordance with a normal rate-adaptation mode.

In one embodiment, processing logic repeatedly determines the packet error rate in conjunction with the transmission rate for a period of duration. Processing logic calculates a throughput value based on the packet error rate. Processing logic selects a transmission rate which is associated with the best throughput value.

Figure 3:
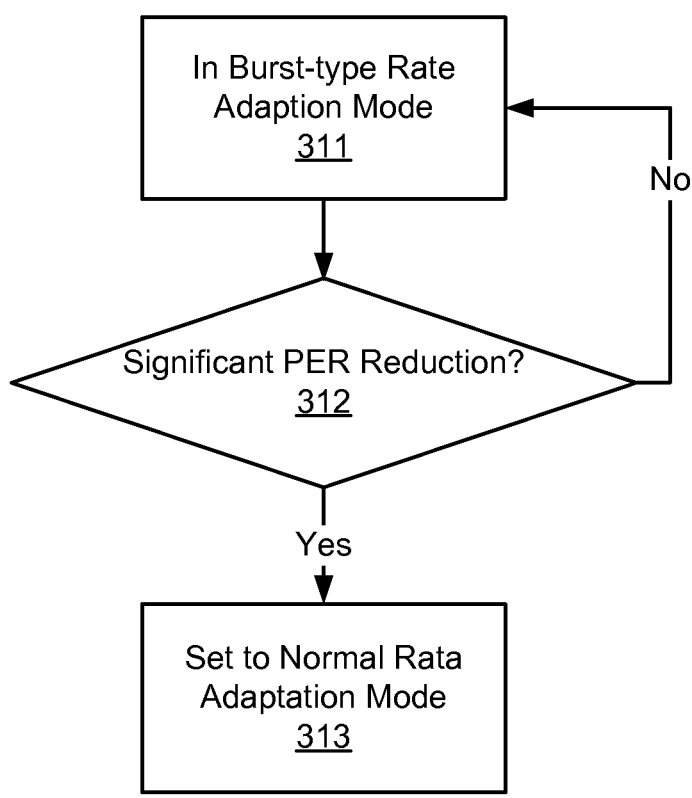
FIG. 3 is a flow diagram of one embodiment of a process to change a rate-adaptation mode.

FIG. 3 is a flow diagram of one embodiment of a process to change a rate-adaptation mode. The process is performed by processing logic that may comprise hardware (circuitry, dedicated logic, etc.), software (such as one that is run on a general-purpose computer system or a dedicated machine), or a combination of both. In one embodiment, the process is performed in conjunction with a network apparatus (e.g., network apparatus 260 with respect to FIG. 1). In one embodiment, the process is performed by a computer system with respect to FIG. 5.

Referring to FIG. 3, in one embodiment, processing logic begins by determining the current rate-adaptation mode (process block 311). If the current mode is a burst-type rate-adaptation mode, processing logic reverts to a normal adaptation mode if the packet error rate decreases significantly (process blocks 312-313). Otherwise, processing logic continues to operate in conjunction with the burst-type rate-adaptation mode (process block 311). Processing logic continues to monitor or sample statistics to determine whether the packet error rate has decreased significantly.

In another embodiment, processing logic reverts to the normal rate-adaptationrate adaptation mode after a predetermined period of time.

Figure 4:
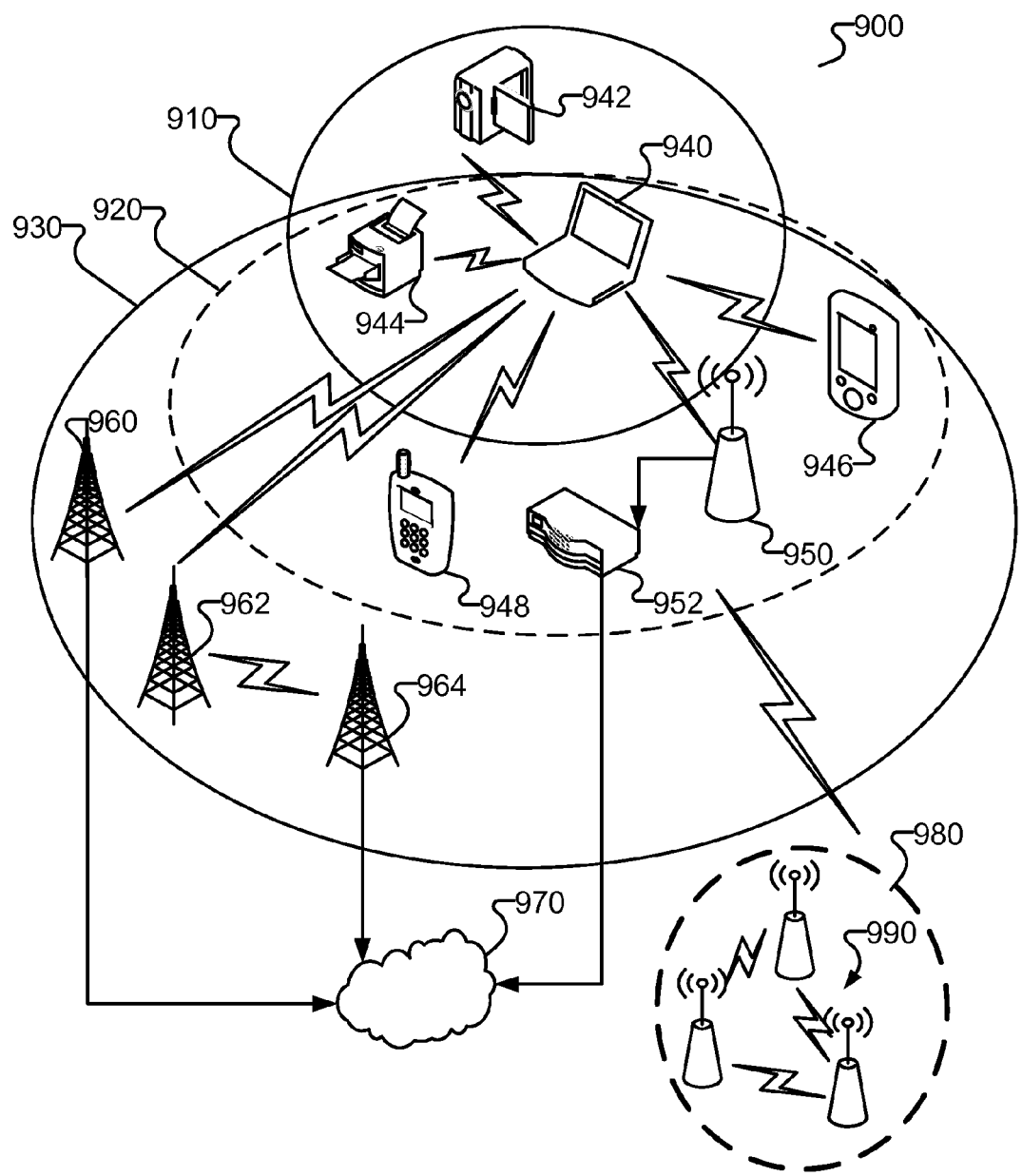
FIG. 4 is a diagram representation of a wireless communication system in accordance with one embodiment of the invention.

FIG. 4 is a diagram representation of a wireless communication system in accordance with one embodiment of the invention. Referring to FIG. 4, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices, such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques, such as spread-spectrum modulation (e.g., direct-sequence code division multiple access (DS-CDMA), frequency-hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct-sequence spread-spectrum (DSSS) modulation, frequency-hopping spread-spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN), such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDP A) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 4 depicts a WP AN, a WLAN, and a WMAN, in one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown), such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high-performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer-system topologies and architectures.

Figure 5:
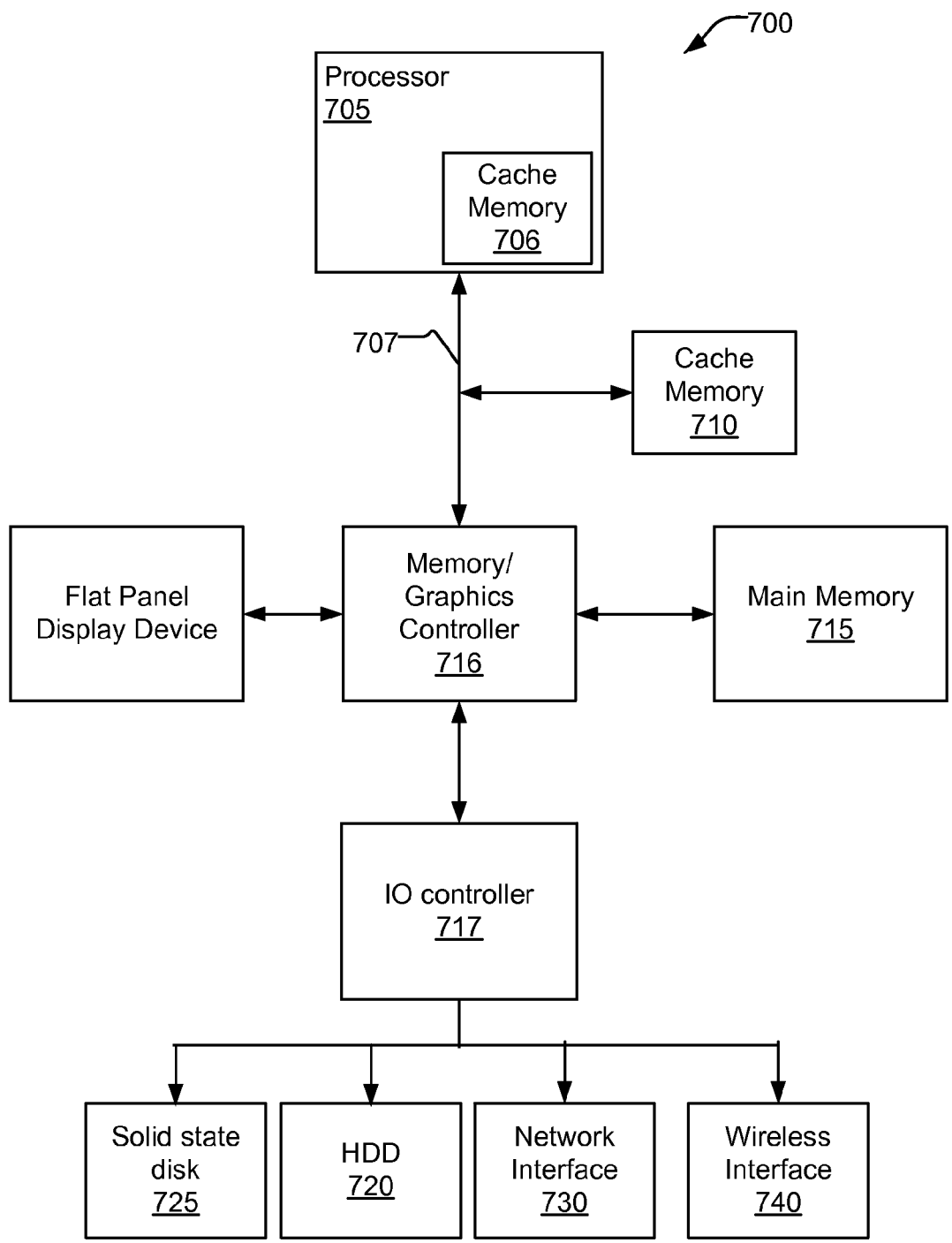
FIG. 5 illustrates a computer system for use with one embodiment of the present invention.

FIG. 5 illustrates an example of a computer system in conjunction with one embodiment of the invention. Processor 705 accesses data from level 1 (L1) cache memory 706, level 2 (L2) cache memory 710, and main memory 715. In one embodiment, cache memory 710 is a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid-state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for a wireless communication network, comprising:
   detecting burst-type interference based at least on a packet error rate and a first transmission rate associated with a transmitter, the burst-type interference being detected by:
   setting the first transmission rate to a highest transmission rate;
   setting the first transmission rate to a lowest transmission rate; and
   determining that burst-type interference occurred if the packet error rate for the lowest transmission rate is greater than the packet error rate for the highest transmission rate; and
   setting, if burst-type interference is detected, a second transmission rate that is greater than the first transmission rate.

2. The method of claim 1, further comprising determining the packet error rate associated with the transmitter.

3. The method of claim 1, wherein the second transmission rate comprises a burst-type rate adaptation mode that increases data throughput associated with the transmitter.

4. The method of claim 1, wherein the detecting further comprises:
   determining a slew rate based on two or more sets of data about the packet error rate and the first transmission rate, the slew rate being positive if the packet error rate is positively correlated with the first transmission rate, and the slew rate being negative if the packet error rate is negatively correlated with the first transmission rate; and
   determining a rate-adaptation mode based on whether the slew rate is positive or negative.

5. The method of claim 4, wherein the detecting further comprises determining a plurality of values of the packet error rate for a plurality of values of the first transmission rate.

6. The method of claim 1, wherein the detecting further comprises:
   setting an indication of burst-type interference if the packet error rate has decreased for the second higher transmission rate.

7. The method of claim 3, wherein the second transmission rate comprises a second rate-adaptation mode for use with a thermal-noise interference if burst-type interference is not detected.

8. The method of claim 3, further comprising reverting to a normal rate-adaptation mode after a first duration.

9. The method of claim 1, further comprising:
   transmitting data at the first transmission rate for a first duration;
   determining, repeatedly, the packet error rate for the first transmission rate for the first duration;
   determining a throughput value based on the packet error rate; and
   determining whether to change the first transmission rate based on the throughput value.

10. An apparatus, comprising:
    a transmitter associated with a first transmission rate;
    a packet error rate determination unit to determine a packet error rate associated with the first transmitter; and
    a controller to detect, based at least on the packet error rate and the first transmission rate, burst-type interference, the burst-type interference being detected based on the first transmission rate being set to a highest transmission rate and to a lowest transmission rate, and the burst-type interference occurring if the packet error rate for the lowest transmission rate is greater than the packet error rate for the highest transmission rate, the controller being further operable to select a first rate-adaptation mode if burst-type interference is detected, the first rate-adaptation mode comprising a transmission rate that is greater than the first transmission rate.

11. The apparatus of claim 10, wherein the controller is further operable to:
    cause the packet error determination unit to determine the packet error rate for different settings of the first transmission rate;
    determine a trend based on data about the packet error rate and the first transmission rate; and
    change the first transmission rate according the first rate-adaptation mode if the determined trend is negative, the first rate-adaptation mode being a burst-type rate-adaptation mode.

12. The apparatus of claim 10, wherein the controller is further operable to:
    switch to the first rate-adaptation mode if the packet error rate has decreased for the second higher transmission rate.

13. The apparatus of claim 10, wherein the controller is further operable to:
    cause the packet error determination unit to determine a first packet error rate value and a second packet error rate value during which the first transmission rate is at a lowest transmission rate and a highest transmission rate, respectively; and
    indicate an occurrence of burst-type interference if the first packet error rate value is greater than the second packet error rate value.

14. The apparatus of claim 10, wherein the controller is further operable to set to a second ordinary rate-adaptation mode if the packet error rate decreases as a result of the burst-type interference being reduced.

15. The apparatus of claim 10, wherein the transmitter is operable to transmit data at the first transmission rate for a first duration, wherein the packet error determination unit is operable to sample, repeatedly, the packet error rate for the first duration, wherein the controller is operable to determine a throughput value based on the packet error rate during the first duration and is operable to determine whether to change the first transmission rate based on the determined throughput value.

16. A network system, comprising:
    a processor;
    a memory coupled to the processor; and
    a communication device, coupled to the processor to communicate wirelessly, comprising:
    a transmitter associated with a first transmission rate; and
    a controller to determine a packet error rate associated with the first transmitter and to detect, based at least on the packet error rate and the first transmission rate, burst-type interference, the burst-type interference being detected based on the first transmission rate being set to a highest transmission rate and to a lowest transmission rate, and the burst-type interference occurring if the packet error rate for the lowest transmission rate is greater than the packet error rate of the highest transmission rate, the controller being further operable to select a first rate-adaptation mode if burst-type interference is detected, the first rate-adaptation mode comprising a transmission rate that is greater than the first transmission rate.

17. The system of claim 16, wherein the communication device further is operable to:

compute a slew rate based on data about packet error rate data and the first transmission rate data, the slew rate being positive if the packet error rate is positively correlated with the first transmission rate, and the slew rate being negative if the packet error rate is negatively correlated with the first transmission rate; and set the first transmission rate according the first rate-adaptation mode if the slew rate is negative, the first rate-adaptation mode comprising a burst-type rate-adaptation mode.

18. The system of claim 16, wherein the communication device is further operable to set to a second ordinary rate-adaptation mode if the packet error rate decreases as a result of burst-type interference being reduced.

* * * * *